US012800405B2

(12) United States Patent
Matsushima et al.

(10) Patent No.: US 12,800,405 B2
(45) Date of Patent: Nov. 17, 2026

(54) TEMPERATURE SENSOR

(71) Applicant: Yazaki Corporation, Tokyo (JP)

(72) Inventors: Tomohiro Matsushima, Shizuoka (JP); Kenta Tanaka, Shizuoka (JP); Akinori Sakamoto, Shizuoka (JP); Hiraku Tanaka, Shizuoka (JP); Kohei Oshiba, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 247 days.

(21) Appl. No.: 18/787,378

(22) Filed: Jul. 29, 2024

(65) Prior Publication Data

US 2024/0385051 A1 Nov. 21, 2024

Related U.S. Application Data

(63) Continuation of application No. PCT/JP2023/007128, filed on Feb. 27, 2023.

(30) Foreign Application Priority Data

Mar. 1, 2022 (JP) ................................ 2022-030677

(51) Int. Cl.
*G01K 1/16* (2006.01)
*G01K 1/14* (2021.01)

(52) U.S. Cl.
CPC ................. *G01K 1/16* (2013.01); *G01K 1/14* (2013.01)

(58) Field of Classification Search
CPC ............ G01K 1/16; G01K 1/14; G01K 1/143; G01K 1/18
See application file for complete search history.

(56) References Cited

U.S. PATENT DOCUMENTS

| | | | | |
|---|---|---|---|---|
| 10,060,803 | B2 * | 8/2018 | Nakagawa | G01K 7/00 |
| 2009/0110024 | A1 * | 4/2009 | Kamei | G01K 15/00 374/3 |
| 2018/0364108 | A1 | 12/2018 | Tanaka et al. | |
| 2019/0178723 | A1 | 6/2019 | Yanagida et al. | |
| 2020/0014083 | A1 * | 1/2020 | Matsushima | G01K 1/14 |
| 2020/0363268 | A1 | 11/2020 | Matsushima | |
| 2022/0255154 | A1 | 8/2022 | Dong et al. | |

FOREIGN PATENT DOCUMENTS

| | | | | |
|---|---|---|---|---|
| CN | 210487079 | U | * | 5/2020 |
| JP | H08233845 | A | * | 9/1996 |
| JP | 2000-346731 | A | | 12/2000 |
| JP | 2009122090 | A | * | 6/2009 |
| JP | 2017-227555 | A | | 12/2017 |
| JP | 2019-2893 | A | | 1/2019 |
| JP | 2019002892 | A | * | 1/2019 |

(Continued)

*Primary Examiner* — Laura Martin Sweeney
*Assistant Examiner* — Julia Fitzpatrick
(74) *Attorney, Agent, or Firm* — Sughrue Mion, PLLC

(57) ABSTRACT

A temperature sensor includes a sensor part that is attached to a flexible thin sheet-shaped electric wire and detects a temperature of a part to be measured. Further, the temperature sensor includes a heat collecting part that is formed of a member with high thermal conductivity, that contacts the part to be measured, and that can transfer heat generated by the part to be measured to the sensor part. The heat collecting part includes a peripheral wall arranged to surround at least a part of sides of the sensor part.

3 Claims, 14 Drawing Sheets

(56) References Cited

FOREIGN PATENT DOCUMENTS

| | | | | | |
|---|---|---|---|---|---|
| JP | 2019039834 | A | * | 3/2019 | ............. G01K 1/143 |
| JP | 2019-133888 | A | | 8/2019 | |
| JP | 2020012809 | A | * | 1/2020 | |
| JP | 2020-187008 | A | | 11/2020 | |
| WO | 2021/024718 | A1 | | 2/2021 | |

* cited by examiner

TEMPERATURE SENSOR

CROSS-REFERENCE TO RELATED APPLICATIONS

The present application is a continuation of International Application No. PCT/JP2023/007128, filed on Feb. 27, 2023, and based upon and claims the benefit of priority from Japanese Patent Application No. 2022-030677, filed on Mar. 1, 2022, the entire contents of which are incorporated herein by reference.

TECHNICAL FIELD

The present application relates to a temperature sensor.

BACKGROUND

Japanese Unexamined Patent Application Publication No. 2017-227555 discloses a technique relating to a temperature sensor having a temperature detection element (sensor part). The temperature sensor is held by a sensor holder while a detection surface thereof is energized by an energizing member to contact a measurement object. In addition, the sensor holder has a housing part for holding the temperature sensor movably in a direction toward or away from the measurement object, and the housing part has a gap for allowing inclination of the temperature sensor. Due to the above, a contact state between the temperature sensor and the measurement object can be maintained, and the temperature detection accuracy can be suppressed from being deteriorated.

SUMMARY OF THE INVENTION

However, in the temperature sensor disclosed in Patent Literature 1, the temperature detection element is disposed on an upper surface of a contact plate of which a lower surface serves as the detection surface of the temperature sensor, and heat generated by a part to be measured is transferred to the temperature detection element from the plate-like contact plate disposed below the element.

In this way, in the above prior art, heat generated by the part to be measured is transferred to the temperature detection element from only the contact plate positioned below the element. Therefore, even if the contact state between the temperature sensor and the measurement object can be maintained, it may not be possible to efficiently transfer the heat generated by the part to be measured to the temperature detection element.

It is an object of the present application to provide a temperature sensor capable of more efficiently transferring heat generated by a part to be measured to a sensor part.

A temperature sensor according to the present application includes: a sensor part that is attached to a flexible thin sheet-shaped electric wire and detects a temperature of a part to be measured; and a heat collecting part that is formed of a member with high thermal conductivity, that contacts the part to be measured, and that can transfer heat generated by the part to be measured to the sensor part, in which the heat collecting part includes a peripheral wall arranged to surround at least a part of sides of the sensor part.

DETAILED DESCRIPTION OF THE INVENTION

Figure 1:
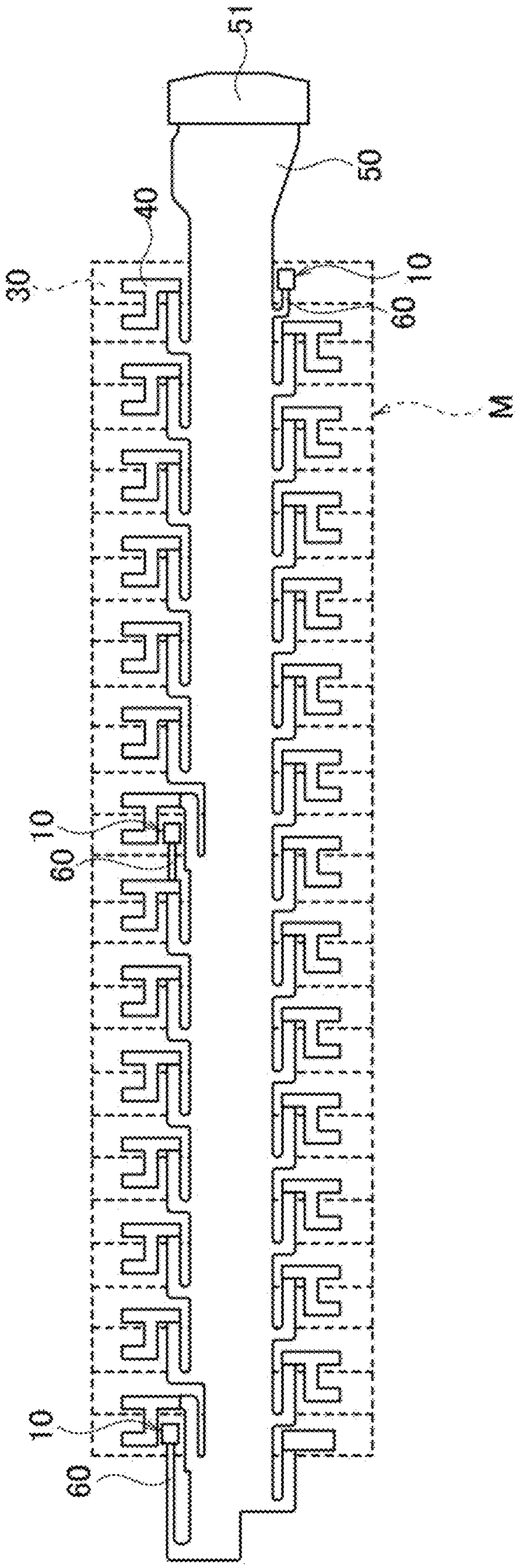
FIG. 1 is a plan view showing an example of a place where a temperature sensor according to the present embodiment is arranged.
Figure 2:
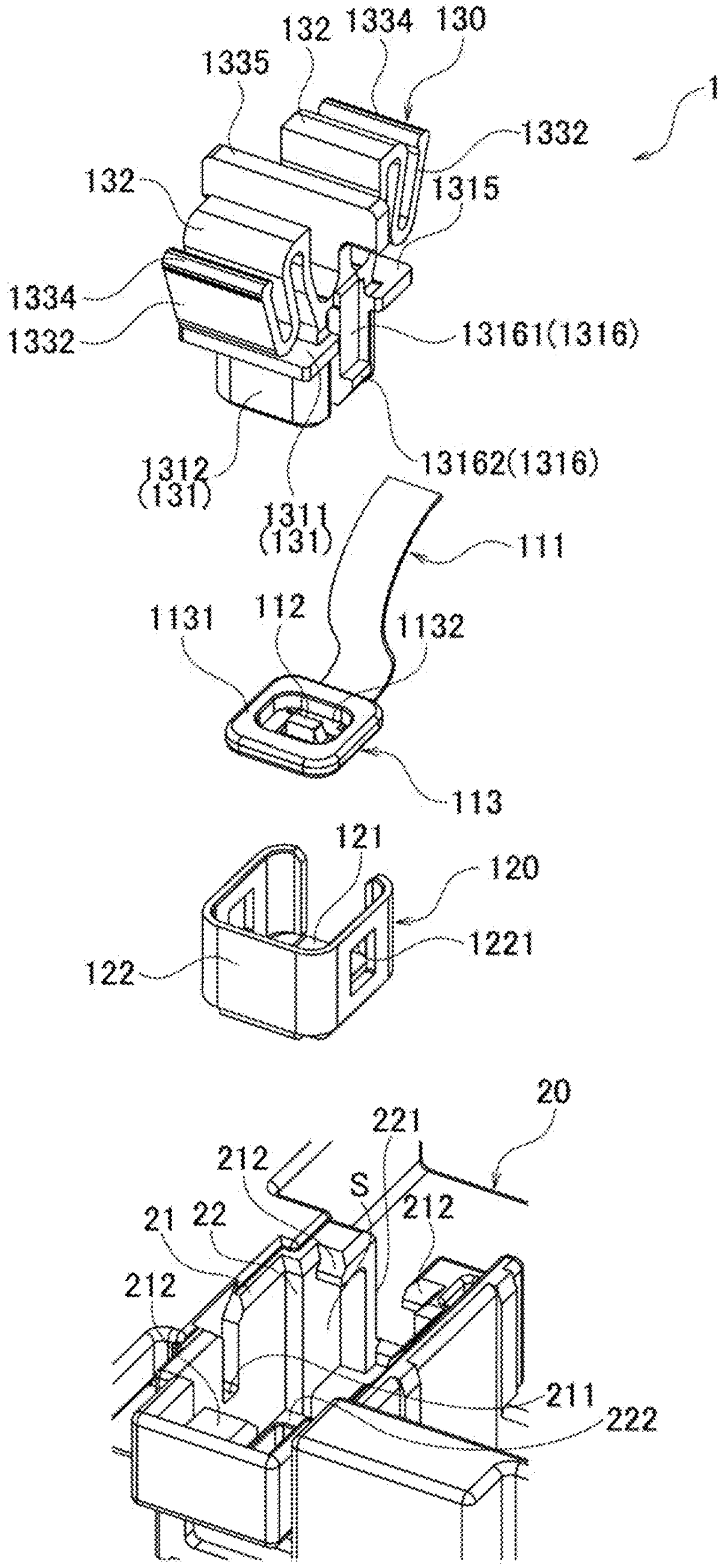
FIG. 2 is an exploded perspective view showing an attaching structure of a temperature sensor according to a first embodiment to a holding member.

A temperature sensor according to the present embodiment will be described in detail below with reference to the drawings. A temperature sensor for detecting a temperature of a single battery of a battery module mounted in an electrified vehicle (for example, HV, PHV, EV, FCV, and the like) will be exemplified below. Note that the dimensional ratios in the drawings are exaggerated for illustrative purposes and may differ from the actual ratios.

A Further, in the following description, an up and down direction of the temperature sensor will be defined and explained while the single battery is positioned below the temperature sensor and the temperature sensor is brought into contact with the single battery from above. A direction in which a pair of sidewalls of a holding member face each other will be defined and explained as a front and rear direction of the temperature sensor and the holding member, and a width direction of the sidewalls will be defined and explained as a width direction of the temperature sensor and the holding member.

Further, the following embodiments include similar constituent elements. Therefore, in the following, the similar constituent elements are denoted with common reference numerals and therefore overlapping descriptions will be omitted.

First, a description will be given regarding an example of a place where a temperature sensor 10 according to the present embodiment is arranged with reference to FIG. 1.

The temperature sensor 10 according to the present embodiment detects a temperature of a single battery (part to be measured) 30 which is mounted in an electrified vehicle, such as an electric vehicle or a hybrid electric vehicle, and used as a driving source.

Specifically, a plurality of single batteries 30 (28 in the present embodiment) are arranged side by side in a line, and terminals (not shown) of the single batteries 30 adjacent to each other are connected to a bus bar 40 for forming a battery pack (battery module) M, in which the plurality of single batteries 30 are connected in series or in parallel. A temperature sensor 10 is arranged so as to contact a single battery 30 of the plurality of single batteries 30 in the battery pack M. In the present embodiment, three temperature sensors 10 contact three single batteries 30 of the plurality of single batteries 30, respectively. As the single battery 30, a lithium battery can be used, for example.

Further, in the present embodiment, the three temperature sensors 10 are connected to a flexible printed circuit board (FPC) 50. Pieces of temperature data of the three single batteries 30 detected by the three temperature sensors 10, respectively are output to an Electrical Control Unit (ECU) via a connector 51. In this way, in the present embodiment, by using the flexible printed circuit board (FPC) 50, a bus bar module connected to the battery pack (battery module) M can be reduced in height while the degree of freedom in the arrangement of electronic components is enhanced.

Further, the temperature sensors 10 contact the single batteries 30 while being held in a housing (holding member 20) of the bus bar module. That is, the temperature sensors 10 contact the single batteries 30 while being held by the holding member 20, and this forms an attaching structure 1 of the temperature sensors 10.

A specific configuration of the attaching structure 1 of the temperature sensors 10 will be described below.

First Embodiment

First, the attaching structure 1 of the temperature sensor 10 according to a first embodiment will be described with reference to FIGS. 2 through 15.

The attaching structure 1 of the temperature sensor 10 according to the first embodiment is formed by the holding member 20 holding the temperature sensor 10 while regulating upward movement of the temperature sensor 10 in an up and down direction.

The holding member 20 can be formed of a material such as a synthetic resin, and a space S opening upward is formed therein, for example. The temperature sensor 10 is inserted into the space S. Specifically, the holding member 20 has a pair of sidewalls 21 which extend in the up and down direction and face each other in a front and rear direction, and guide walls 22 which are connected consecutively to both sides in a width direction of the pair of sidewalls 21 so as to project in the front and rear direction and guide the insertion of the temperature sensor 10 into the space S.

Further, a slit 211 opening upward and extending in the up and down direction is formed at a center portion of each of the pair of sidewalls 21 in the width direction. Further, locked parts 212, where the temperature sensor 10 is locked, are formed at upper portions on both sides in the width direction between the pair of sidewalls 21 so as to extend in the width direction.

Meanwhile, a notch 221 opening upward and extending in the up and down direction and width direction is formed between the guide walls 22 facing each other in the front and rear direction, and a placing wall 222 on which a pressing part 131 described later of the temperature sensor 10 is placed, is formed at a lower end of the notch 221.

The temperature sensor 10 includes a temperature sensor module 110, a case 120 into which the temperature sensor module 110 is inserted and which holds the temperature sensor module 110, and an energizing member 130 capable of pressing the temperature sensor module 110.

Figure 3:
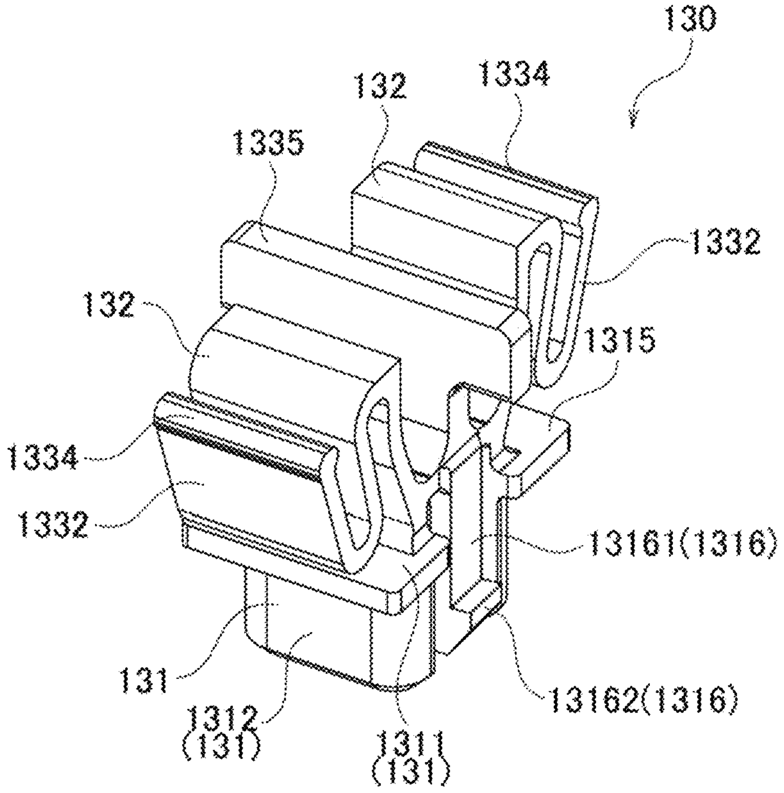
FIG. 3 is a perspective view showing an example of an energizing member of the temperature sensor according to the first embodiment.

As shown in FIG. 3, the temperature sensor module 110 includes a flexible thin sheet-shaped electric wire 111, and a sensor chip (sensor part) 112 which is attached to the flexible thin sheet-shaped electric wire 111 and detects a temperature of a single battery (part to be measured) 30. Further, the temperature sensor module 110 includes a frame-shaped member 113 arranged around the sensor chip 112, and a resin cover part 114 which is formed by filling a resin between the frame-shaped member 113 and the sensor chip 112 and which covers the sensor chip 112 to prevent the sensor chip 112 from being exposed to the outside.

In the present embodiment, a flexible printed circuit board (FPC) is used as the flexible thin sheet-shaped electric wire 111. The flexible printed circuit board (FPC) is manufactured by forming a wiring pattern (conductor) with a conductive metal, such as copper foil, on a thin and soft base film with insulation such as polyimide, and adhering a film-like cover such as polyimide thereon. At this point, the film-like cover is adhered on the base film while a part of the conductor is exposed.

In the present embodiment, the flexible thin sheet-shaped electric wire 111 includes a mounting part 1111 disposed at a distal end thereof, and a connection part 1112 connected to the mounting part 1111. On the mounting part 1111, a sensor chip mounting part 1111*a*, on which the sensor chip 112 is mounted, is formed. Then, the sensor chip 112 is placed on the sensor chip mounting part 1111*a* so as to span two conductors 1111*b* exposed in the sensor chip mounting part 1111*a*, and the sensor chip 112 is mounted on the sensor chip mounting part 1111*a* by means of fixing with solder H. In this way, in the present embodiment, an upper surface of the mounting part 1111 serves as a mounting surface 1111*a*, and the sensor chip (sensor part) 112 is mounted on the mounting surface 1111*a* of the flexible thin sheet-shaped electric wire 111 with the solder H.

Further, in the present embodiment, the frame-shaped member 113 is fixed on the mounting part 1111 in a state where the frame-shaped member 113 is arranged around the sensor chip 112. The frame-shaped member 113 can be formed using a material with high thermal conductivity (for example, metals, metal oxides, ceramics, and the like). In the present embodiment, the frame-shaped member 113 is formed of metal. The metal-made frame-shaped member 113 includes an approximately annular peripheral wall 1131, and a through-hole 1132 which is defined by an inner surface 11313 of the peripheral wall 1131 and passes through in the up and down direction. It is preferable to use a material having high thermal conductivity as the material of the frame-shaped member 113 while taking into consideration corrosion or the like of the flexible thin sheet-shaped electric wire 111.

The peripheral wall 1131 is formed in an approximately rectangular annular shape, and the peripheral wall 1131 is fixed on the mounting part 1111 in a state where the peripheral wall 1131 surrounds sides of the approximately rectangular parallelepiped sensor chip 112 from all sides (along the whole circumference). In the present embodiment, four frame-shaped member fixing parts 1111*c* are formed at four corners of the mounting part 1111. The frame-shaped member 113 is fixed on the mounting part 1111 by contacting a lower surface 11312 of the frame-shaped member 113 (surface on a side opposite to a side attached to the flexible thin sheet-shaped electric wire 111) on the four frame-shaped member fixing parts 1111*c*, and fixing them with solder or the like. At this point, a lower opening of the through-hole 1132 is closed by the mounting part 1111 as seen in plan view.

Then, a potting material is poured into the through-hole 1132 of the frame-shaped member 113 from an upper side (upper surface 11311 side: side attached to the flexible thin sheet-shaped electric wire 111) and cured. Accordingly, the sensor chip 112 is covered by the resin cover part 114.

Figure 4:
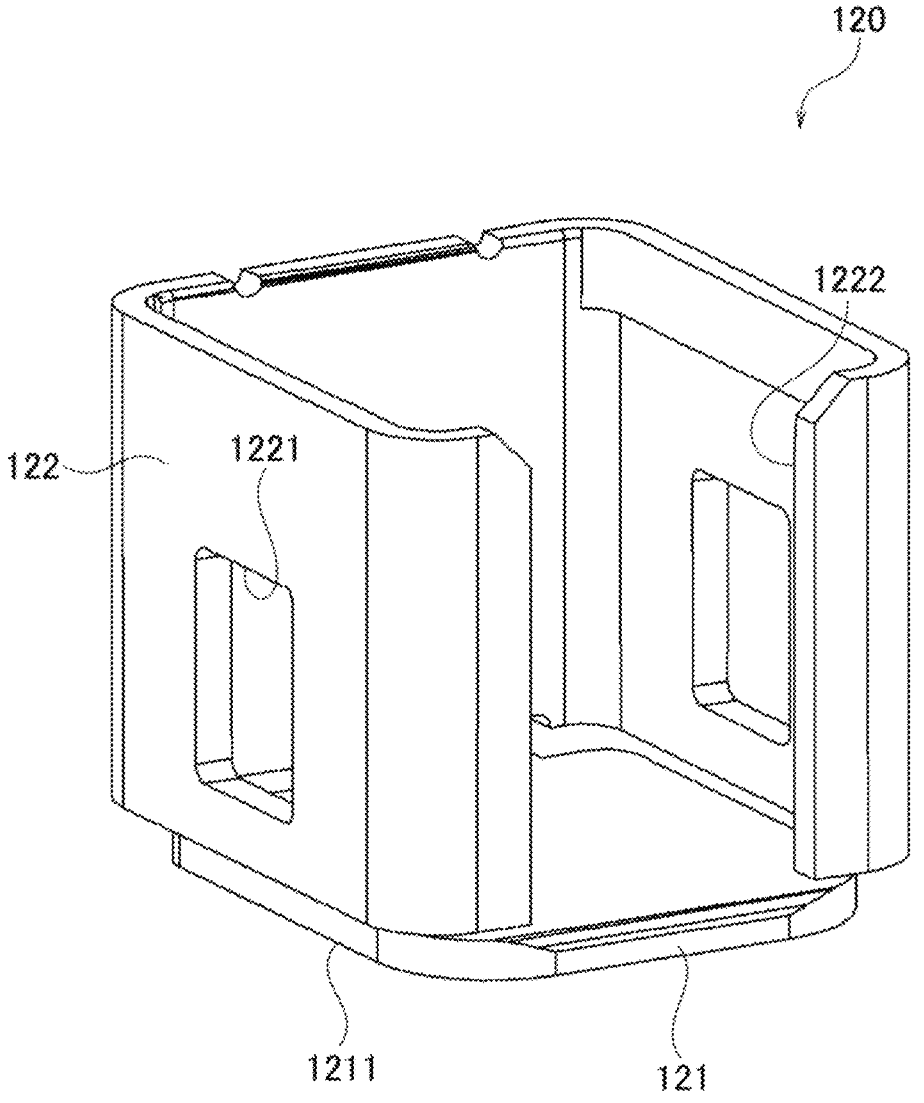
FIG. 4 is a perspective view showing an example of a heat collecting part of the temperature sensor according to the first embodiment.

The case 120 can be formed using a material with high thermal conductivity (for example, metals, metal oxides, ceramics, and the like). In the present embodiment, the case 120 is formed of metal. As shown in FIG. 4, the metal-made case 120 has an approximately rectangular plate-like bottom wall 121, and a peripheral wall 122 connected to the bottom wall 121 via a connecting wall 123, and has an approximately rectangular parallelepiped box shape opened upward. In the present embodiment, the metallic case 120 is formed by bending one metal plate. That is, the bottom wall 121, the connecting wall 123, and the peripheral wall 122 are integrally formed using a metal material. Further, in the present embodiment, a bottom surface 1211 of the bottom wall 121 serves as a contact surface in contact with the single battery 30. It is not always necessary to form the case 120 by bending a single metal plate. It is also possible to form the case 120 by means of casting using a tool, for example.

Further, in the present embodiment, the peripheral wall 122 has a pair of through-holes 1221 passing thorough in the front and rear direction, and a notch 1222 opening upward and extending in the up and down direction. The pair of through-holes 1221 are formed for fixing the pressing part 131 to the case 120. The notch 1222 is formed for preventing the flexible thin sheet-shaped electric wire 111 (connection part 1112) from interfering with the peripheral wall 122 when the temperature sensor module 110 is inserted into the case 120.

In this way, in the present embodiment, when the temperature sensor module 110 is assembled to the case 120, three directions of sides and a lower part of the sensor chip 112, are surrounded by the metallic case 120.

The bottom wall 121 of the case 120 is pressed downward (toward the single battery 30) due to the energizing member 130 pressing the temperature sensor module 110 downward (toward the single battery 30). This enables more reliable contact of the bottom surface 1211 of the bottom wall 121 with the single battery 30.

Figure 5:
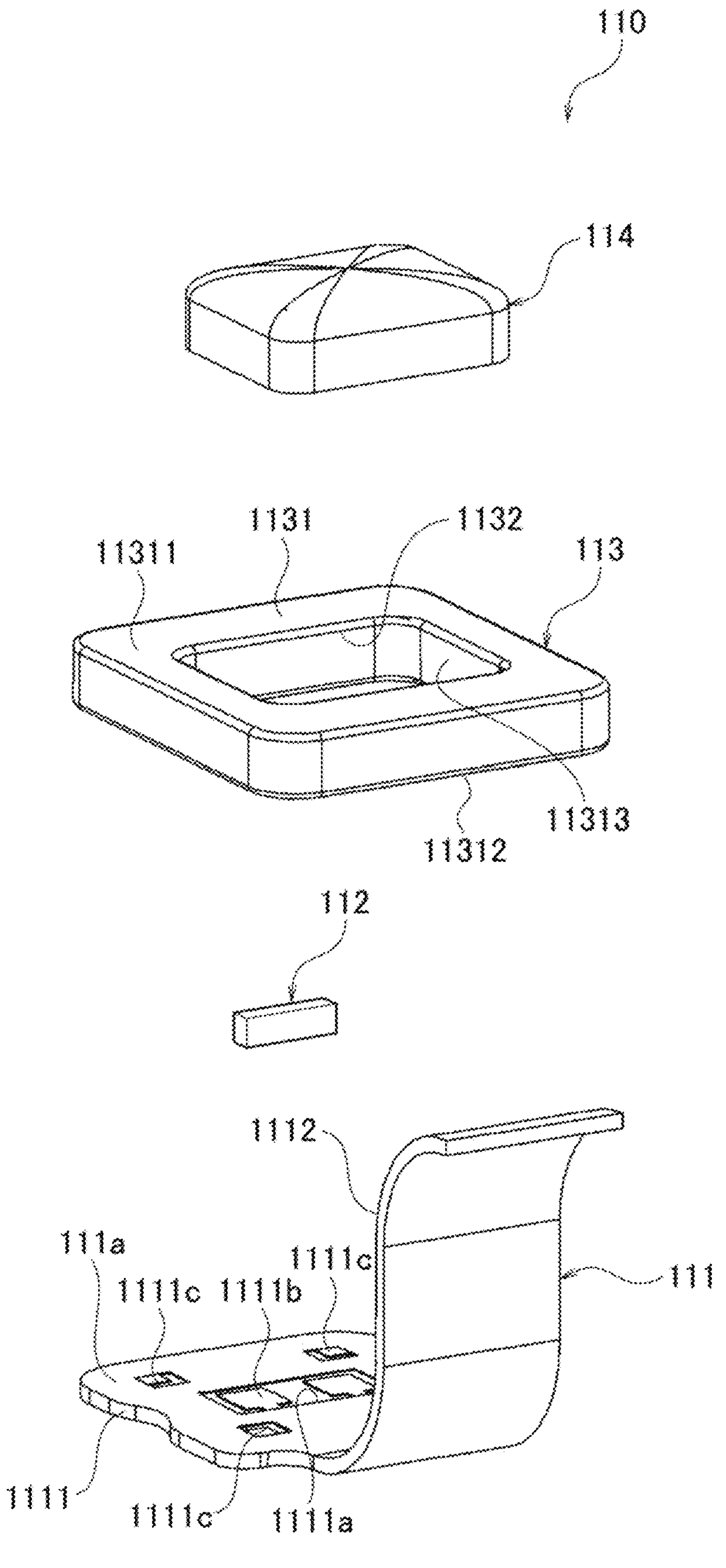
FIG. 5 is an exploded perspective view showing an example of a temperature sensor module of the temperature sensor according to the first embodiment.

As shown in FIG. 5, the energizing member 130 includes the pressing part 131 for pressing the case 120 toward the single battery 30, and an energizing part 132 for imparting, to the pressing part 131, downward energizing force (one side of a pressing direction) for pressing the case 120 toward the single battery 30. In the present embodiment, the energizing member 130 is integrally formed of a resin. That is, the pressing part 131 and the energizing part 132 are integrally formed.

The pressing part 131 has a plate-like base substrate 1311 extending in a horizontal direction, and a pair of pressing pieces 1312 which are connected consecutively to a lower end of the base substrate 1311 and extend downward. The pair of pressing pieces 1312 are members that abut the temperature sensor module 110 and press the temperature sensor module 110 and the case 120 toward the single battery 30.

Further, the pressing part 131 includes a placement part 1315 which is extended in the horizontal direction from the base substrate 1311, and is placed on the placing wall 222.

Further, the pressing part 131 has a locking part 1316 locked to the case 120, and the energizing member 130 is fixed to the metallic case 120 housing the temperature sensor module 110 by the locking part 1316. In the present embodiment, the locking part 1316 has a pair of arm parts 13161 which extend in the up and down direction, and is elastically deformable in the front and rear direction, and hook parts 13162 which are disposed at distal ends of the pair of arm parts 13161, respectively, and are locked to a through-hole 1221. The pair of arm parts 13161 extend downward from both ends in the front and rear direction of a center portion in the width direction of the base substrate 1311. When the pressing part 131 is locked to the case 120 by the locking part 1316, upward movement of the pressing part 131 (the other side of the pressing direction) is regulated.

Further, the energizing part 132 is formed from a leaf spring which is bent in the up and down direction and can be elastically deformed in the front and rear direction. On the outside of the energizing part 132, a locking piece 1332 and a locking part 1334, which can be elastically deformed in the front and rear direction, are disposed.

Further, in the present embodiment, the energizing member 130 has a positioning part 1335. By inserting the positioning part 1335 into the slit 211 formed in the holding member 20, it is possible to achieve positioning of the energizing member 130 relative to the holding member 20, and prevent detachment.

In the present embodiment, although the energizing member 130 has been exemplified in which the pressing part 131 and the energizing part 132 are integrally formed using resins, it is not always necessary to integrally form the pressing part 131 and the energizing part 132. The pressing part 131 and the energizing part 132 can be formed as separate members. At this time, the energizing part 132 can also be formed using an elastic member such as a coil spring. Further, when an elastic member such as a coil spring is used, the elastic member may be directly locked to the holding member 20, or may be locked to the holding member 20 via a member to be held such as a spring holding member. In this way, the energizing member 130 can have various shapes.

In the present embodiment, the holding member 20 and the temperature sensor 10 are configured as described above, and each component is assembled in order from the top so that the attaching structure 1 of the temperature sensor 10 is formed.

An example of a method of assembling the temperature sensor 10 to the holding member 20 will be described below with reference to FIGS. 6 to 12.

Figure 6:
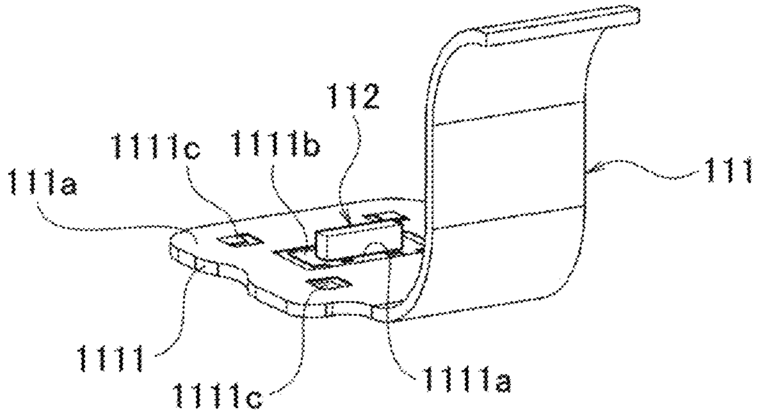
FIG. 6 is a diagram showing an example of a method for attaching the temperature sensor according to the first embodiment to the holding member, and is a perspective view showing a state in which a sensor part is mounted on a flexible thin sheet-shaped electric wire.

First, as shown in FIG. 6, the sensor chip 112 is mounted on the flexible thin sheet-shaped electric wire 111.

Figure 7:
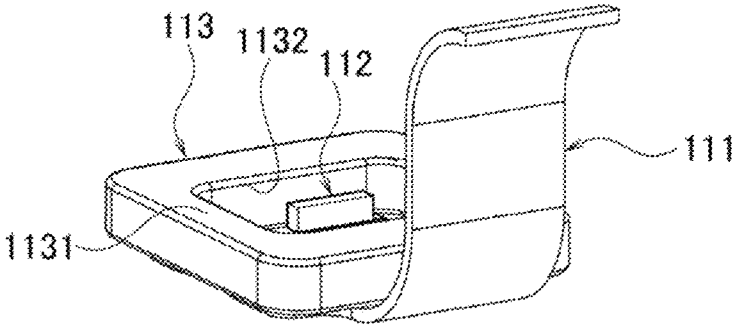
FIG. 7 is diagram showing an example of a method for attaching the temperature sensor according to the first embodiment to the holding member, and is a perspective view showing a state in which a frame-shaped member is attached to the flexible thin sheet-shaped electric wire on which the sensor part is mounted.

Next, as shown in FIG. 7, the frame-shaped member 113 is fixed on the flexible thin sheet-shaped electric wire 111 such that the member is arranged around the sensor chip 112.

Figure 8:
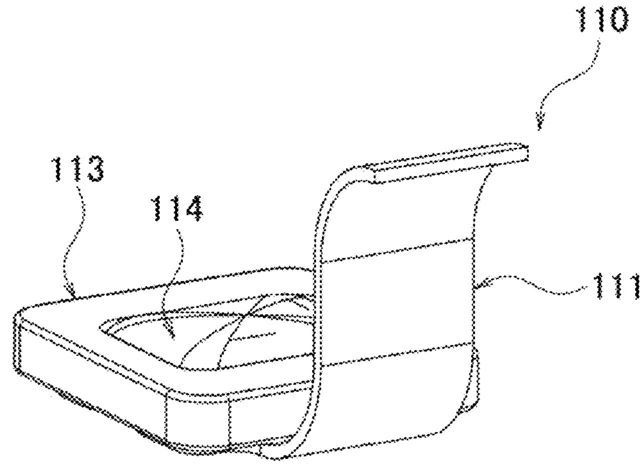
FIG. 8 is a diagram showing an example of a method for attaching the temperature sensor according to the first embodiment to the holding member, and is a perspective view showing a state in which the temperature sensor module is formed by a resin cover part covering the sensor part.

Thereafter, as shown in FIG. 8, the temperature sensor module 110 is formed by pouring a potting material into a gap between the frame-shaped member 113 and the sensor chip 112 to form the resin cover part 114.

Figure 9:
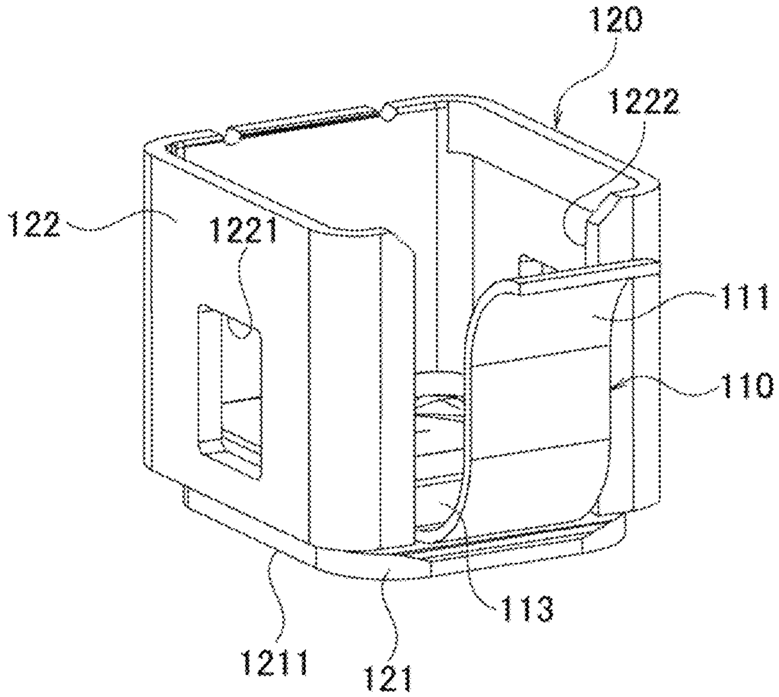
FIG. 9 is a diagram showing an example of a method for attaching the temperature sensor according to the first embodiment to the holding member, and is a perspective view showing a state in which the temperature sensor module is inserted into the heat collecting part.

Next, as shown in FIG. 9, the temperature sensor module 110 is inserted into the case 120 from above, and placed on the bottom wall 121. In the present embodiment, since the size of the frame-shaped member 113 is approximately the same as that of the case 120, the temperature sensor module 110 is inserted toward the bottom wall 121 while being guided by the peripheral wall 122. Therefore, it is possible to prevent the temperature sensor module 110 from being placed on the bottom wall 121 in an inclined state. That is, it is possible to prevent the sensor part 112 from being displaced.

Figure 10:
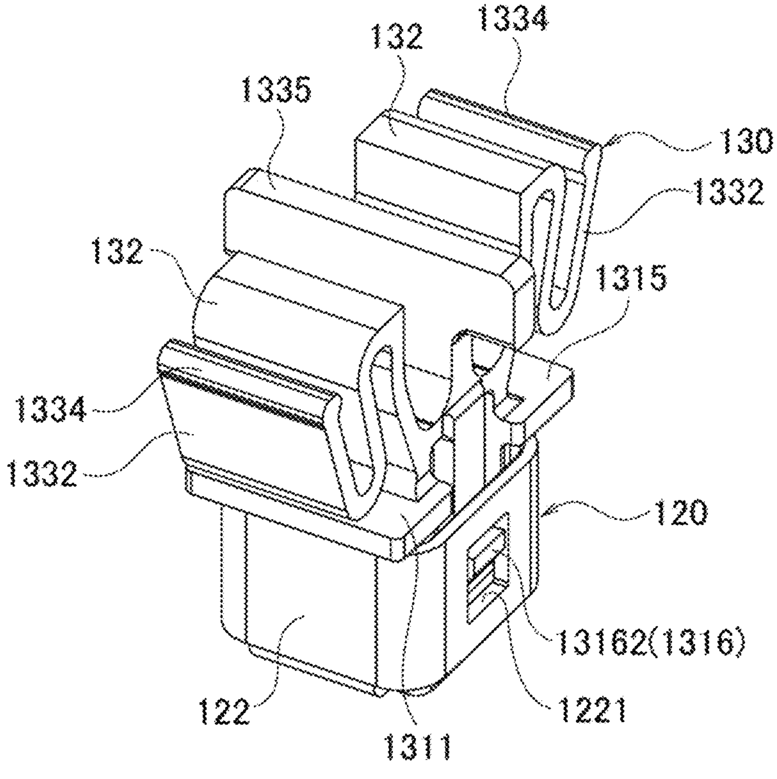
FIG. 10 is a perspective view showing the temperature sensor according to the first embodiment.

Thereafter, as shown in FIG. 10, the pressing part 131 of the energizing member 130 is inserted into, and attached to, the case 120 from an upper side. Specifically, by locking the hook parts 13162 to the through-hole 1221, the pressing part 131 is held by the case 120.

Figure 11:
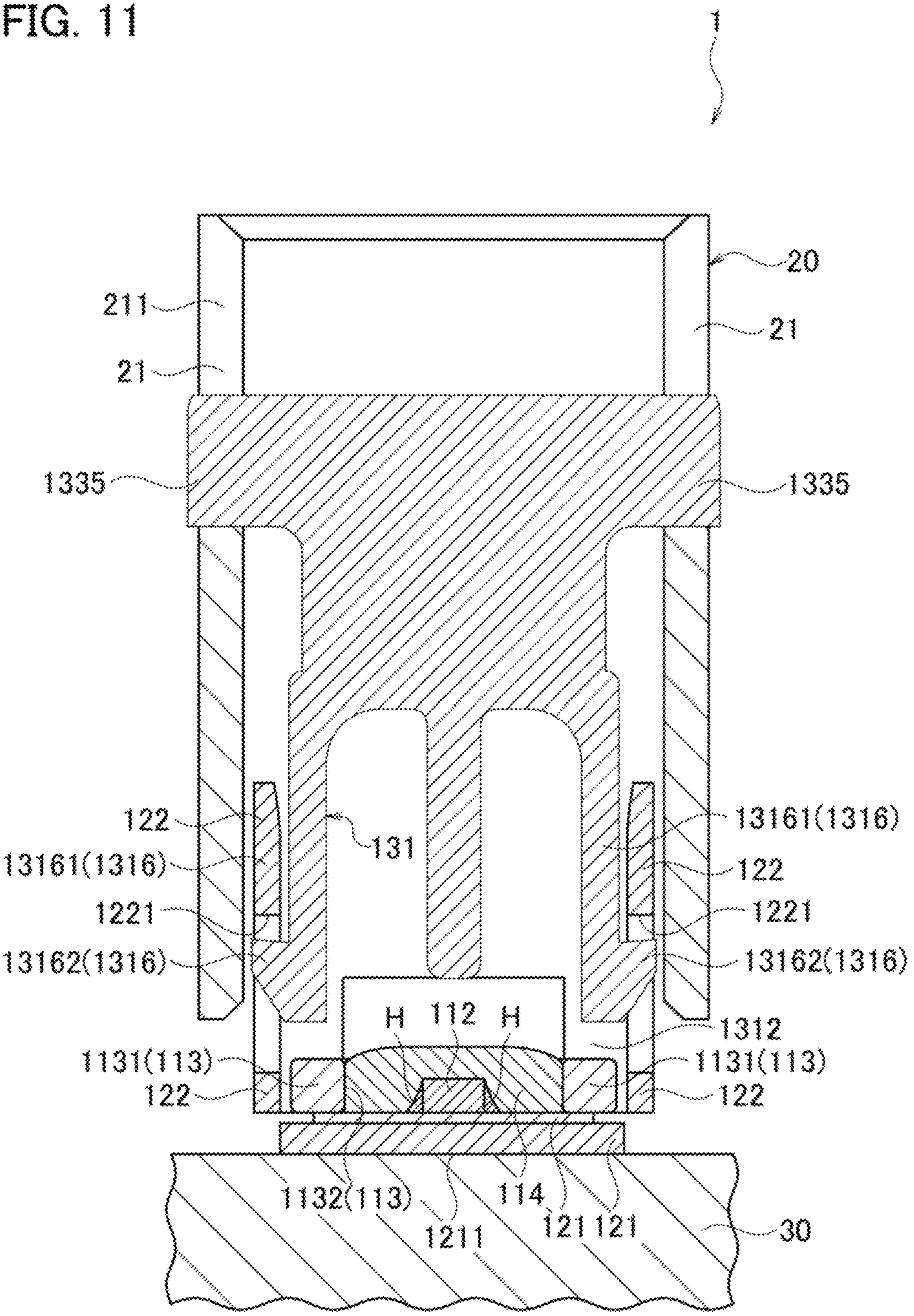
FIG. 11 is a cross sectional view of a state in which the attaching structure for the temperature sensor according to the first embodiment to the holding member is viewed from the front.
Figure 12:
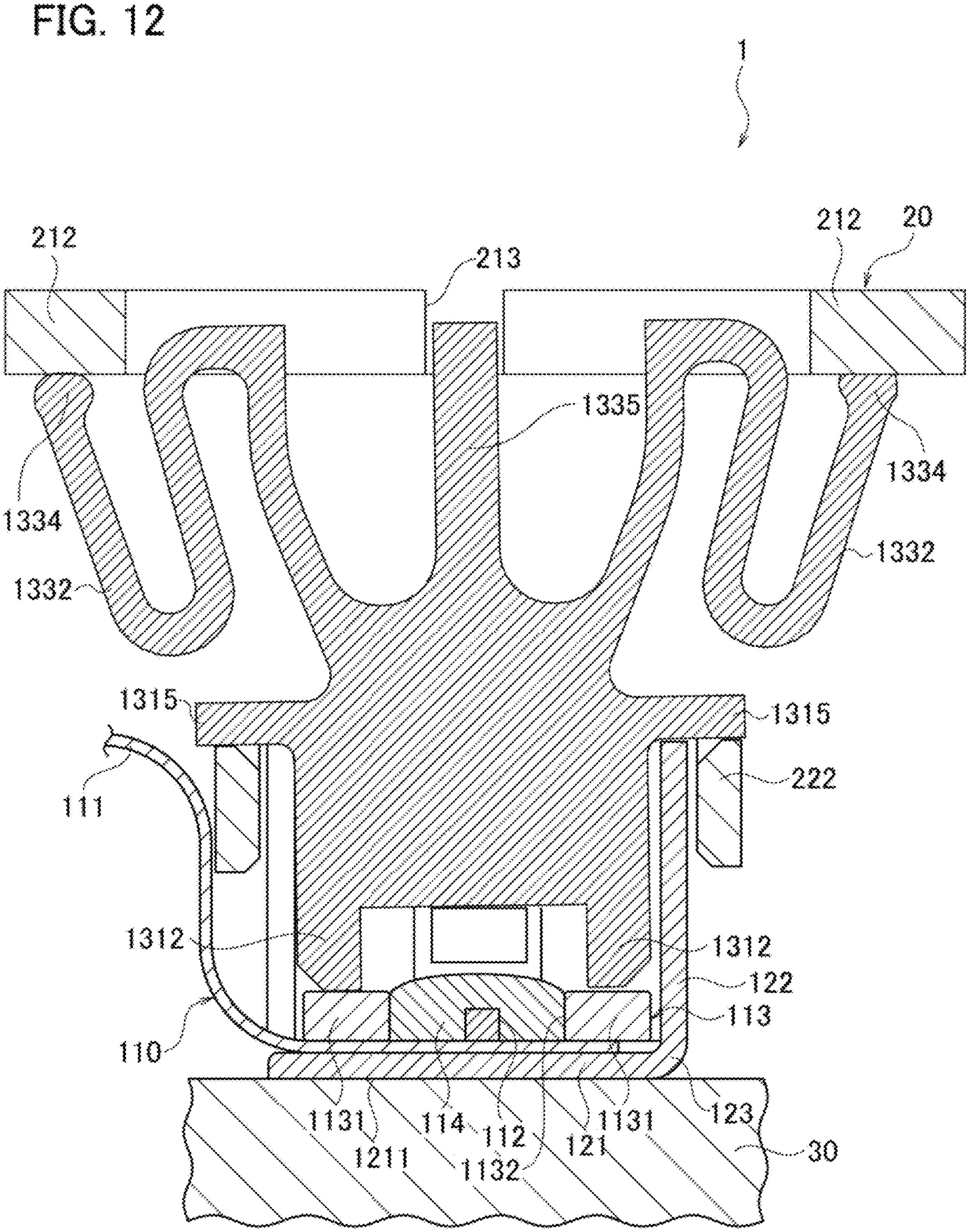
FIG. 12 is a cross sectional view of a state in which the attaching structure for the temperature sensor according to the first embodiment to the holding member is viewed from the side.
Figure 13:
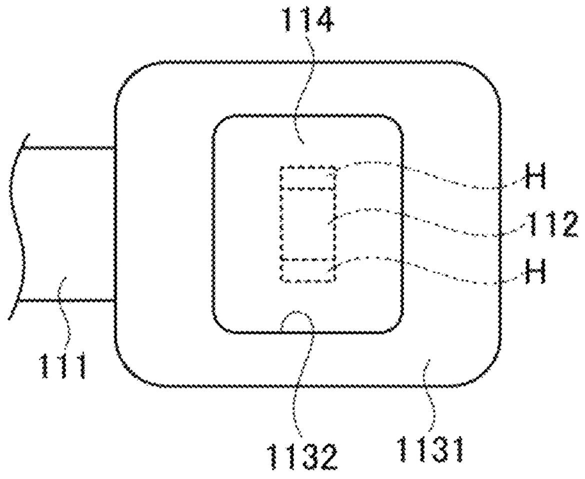
FIG. 13 is a plan view showing the temperature sensor module according to the first embodiment.
Figure 14:
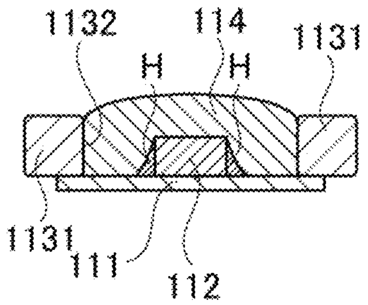
FIG. 14 is a cross sectional view of a state in which the temperature sensor module according to the first embodiment is viewed from the front.
Figure 15:
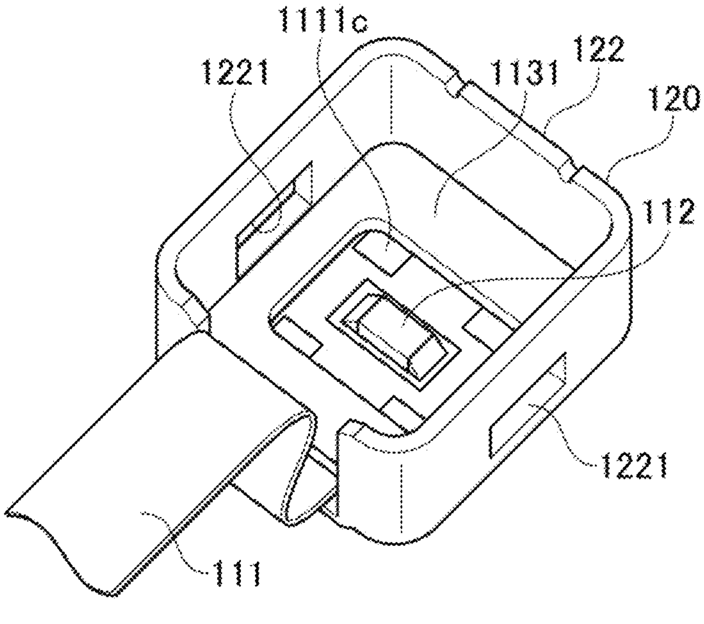
FIG. 15 is a perspective view for explaining a state in which a peripheral wall of the heat collecting part is disposed at sides of the temperature sensor according to the first embodiment.

Thereafter, as shown in FIGS. 11 and 12, the locking part 1334 is abutted to a lower surface of the locked part 212 extending in the horizontal direction of the holding member 20 in order to lock the locking part 1334 to the locked part 212. As a result, the temperature sensor 10 is attached to the holding member 20 while the temperature sensor module 110 is pressed downward by the pressing part 131, which is energized downward due to elastic restoring force of the energizing part 132.

In this way, in the present embodiment, the temperature sensor 10 can be assembled to the holding member 20 without reversing the case 120. In addition, the temperature sensor 10 can be assembled to the holding member 20 without passing the flexible thin sheet-shaped electric wire 111 through a dedicated space. This can suppress erroneous assembly while enhancing assemblability of the temperature sensor 10 to the holding member 20.

In the present embodiment, heat generated by the single battery (part to be measured) 30 can be transferred more efficiently to the sensor chip (sensor part) 112.

Specifically, the temperature sensor 10 has a heat collecting part which is formed of a member with high thermal conductivity, contacts the single battery 30, and can transfer heat generated by the single battery 30 to the sensor chip 112. The heat collecting part has a peripheral wall arranged to surround at least a part of sides of the sensor chip 112.

In the present embodiment, the metallic case 120 functions as the heat collecting part. Specifically, while the bottom surface 1211 of the bottom wall 121 contacts the single battery 30, the bottom wall 121 and the peripheral wall 122 of the metallic case 120 surround three directions of sides and a lower part of the sensor chip 112. This can transfer heat generated by the single battery 30 to the sensor chip 112 from multiple directions. Heat generated by the single battery 30 is first transferred to the bottom wall 121 in contact with the single battery 30, but in the present embodiment, since the metallic case 120 is formed by bending a single metal plate, heat is transferred to the entire case 120 including the peripheral wall 122. As a result, heat is transferred to the sensor chip 112 from multiple directions via the case 120.

Figure 16:
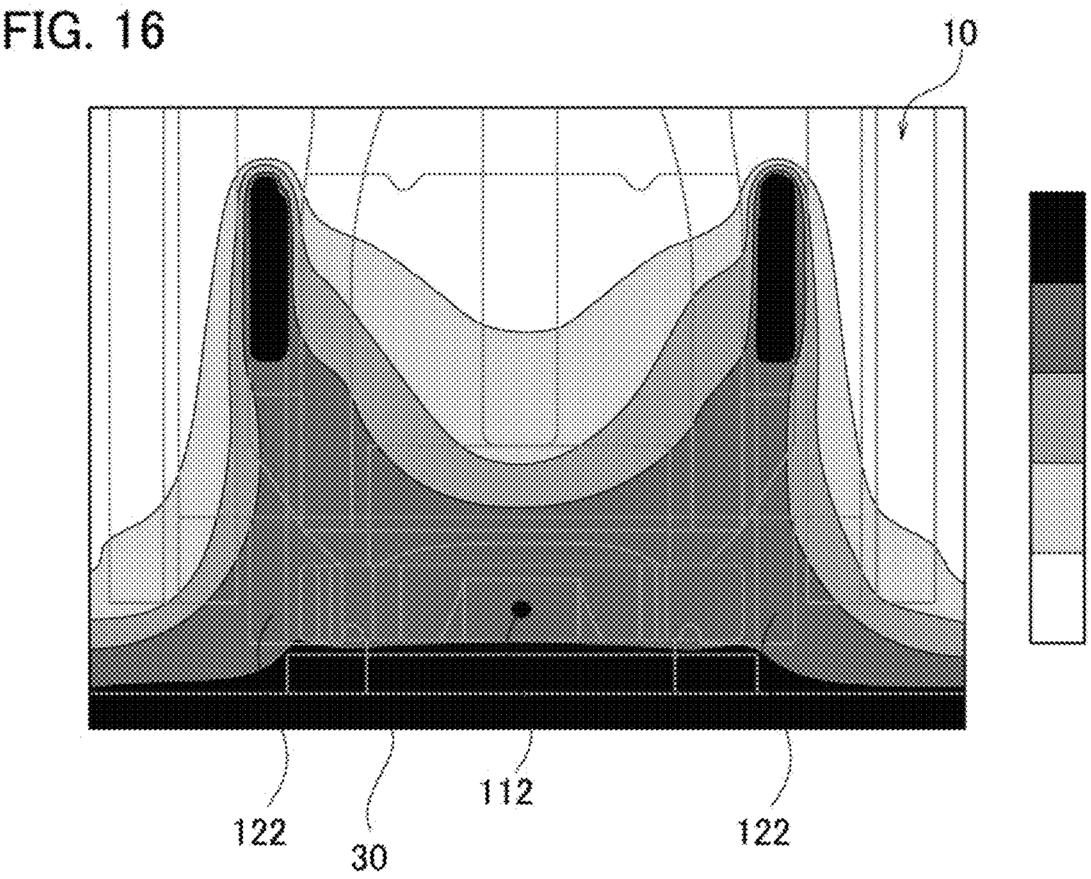
FIG. 16 is a diagram schematically showing a temperature distribution in a state in which the temperature sensor according to the first embodiment is placed horizontally on a part to be measured.

FIG. 16 shows the temperature distribution in the periphery of the single battery (part to be measured) 30 in use. Specifically, FIG. 16 shows a measurement result of the temperature distribution in the periphery of the single battery 30 when the single battery 30 is used while an upper surface of the single battery 30 is in surface contact with the bottom surface 1211 of the bottom wall 121 of the case 120 of the temperature sensor 10 according to the present embodiment. At this point, the temperature sensor 10 according to the present embodiment is placed horizontally on the upper surface of the single battery 30.

A temperature of the periphery of the single battery 30 can be measured using equipment such as thermography, for example. FIG. 16 shows a diagram in which the temperature distribution in the periphery of the single battery 30 is divided into five regions, and a region with a darker color is a higher temperature region than a region with a lighter color.

Figure 17:
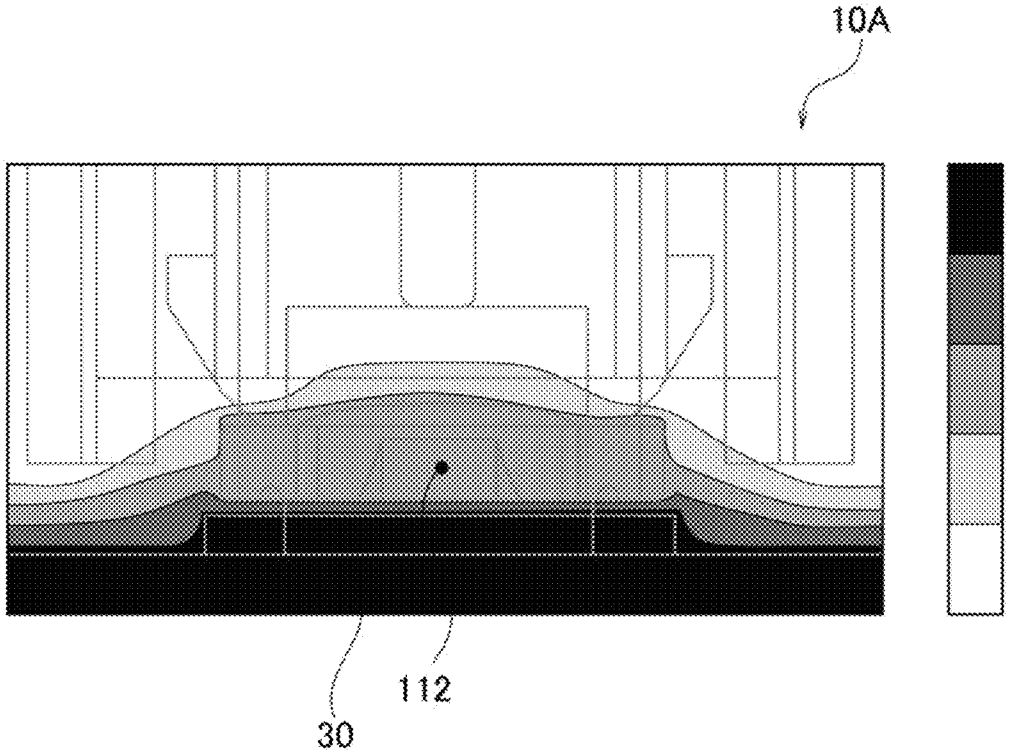
FIG. 17 is a diagram schematically showing a temperature distribution in a state in which a temperature sensor according to a comparative example is placed horizontally on a part to be measured.

Similarly, FIG. 17 shows a measurement result of the temperature distribution in the periphery of the single battery 30 when the single battery 30 is used while the upper surface of the single battery 30 is in surface contact with the bottom surface 1211 of the bottom wall 121 of the case 120 of a temperature sensor 10A according to a comparative example. At this point, the temperature sensor 10A according to the comparative example is also placed horizontally on the upper surface of the single battery 30. FIG. 17 exemplifies a sensor without the case 120 (without the peripheral wall 122) as the temperature sensor 10A according to the comparative example.

Further, FIG. 17 shows a diagram in which the temperature distribution in the periphery of the single battery 30 is divided into five regions, and a region with a darker color is a higher temperature region than a region with a lighter color. The maximum value and the minimum value of each region are set to be the same in FIGS. 16 and 17.

With reference to FIGS. 16 and 17, it can be seen that a temperature of the periphery of the sensor chip (sensor part) 112 is higher (expressed as a dark color region) in the temperature sensor 10 with the peripheral wall 122 than in the temperature sensor 10A without the peripheral wall 122.

Further, it can be seen that a temperature of the sensor chip (sensor part) 112 of the temperature sensor 10 is closer to a temperature of the single battery (part to be measured) 30 than that of the sensor chip (sensor part) 112 of the temperature sensor 10A.

From this, it can be seen that a temperature detected by the sensor chip (sensor part) 112 of the temperature sensor 10 is closer to a temperature of the single battery (part to be measured) 30 than that detected by the sensor chip (sensor part) 112 of the temperature sensor 10A. That is, it can be seen that an error between a temperature detected by a sensor chip (sensor part) 112 and an actual temperature of the single battery (part to be measured) 30 of the temperature sensor 10 is smaller than that of the temperature sensor 10A.

A temperature measurement error of a temperature detected by the sensor chip (sensor part) 112 of the temperature sensor 10 is 0.27° C., while a temperature measurement error of a temperature detected by the sensor chip (sensor part) 112 of the temperature sensor 10A is 1.03° C.

From the measurement results shown in FIGS. 16 and 17, it can be seen that heat transfer/heat collection to the sensor chip (sensor part) 112 is enhanced due to the case 120 as the heat collecting part having the peripheral wall 122.

Figure 18:
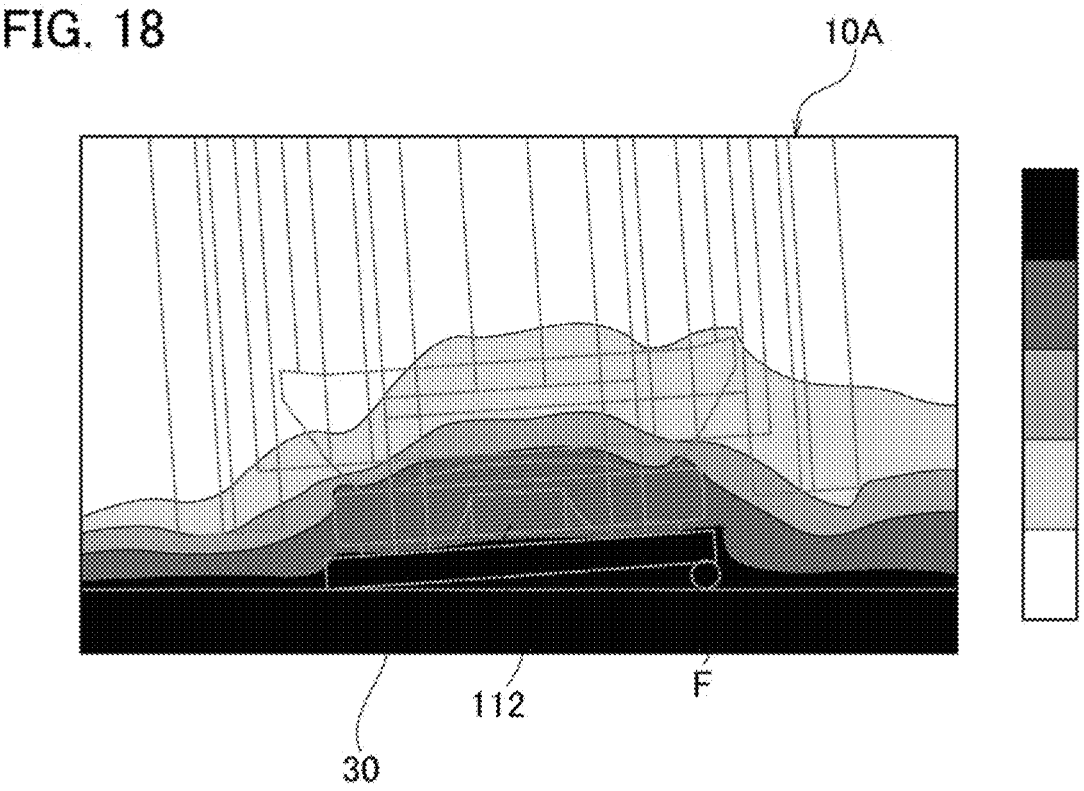
FIG. 18 is a diagram schematically showing a temperature distribution in a state in which a relatively small foreign material is present between the temperature sensor according to the comparative example and the part to be measured.
Figure 19:
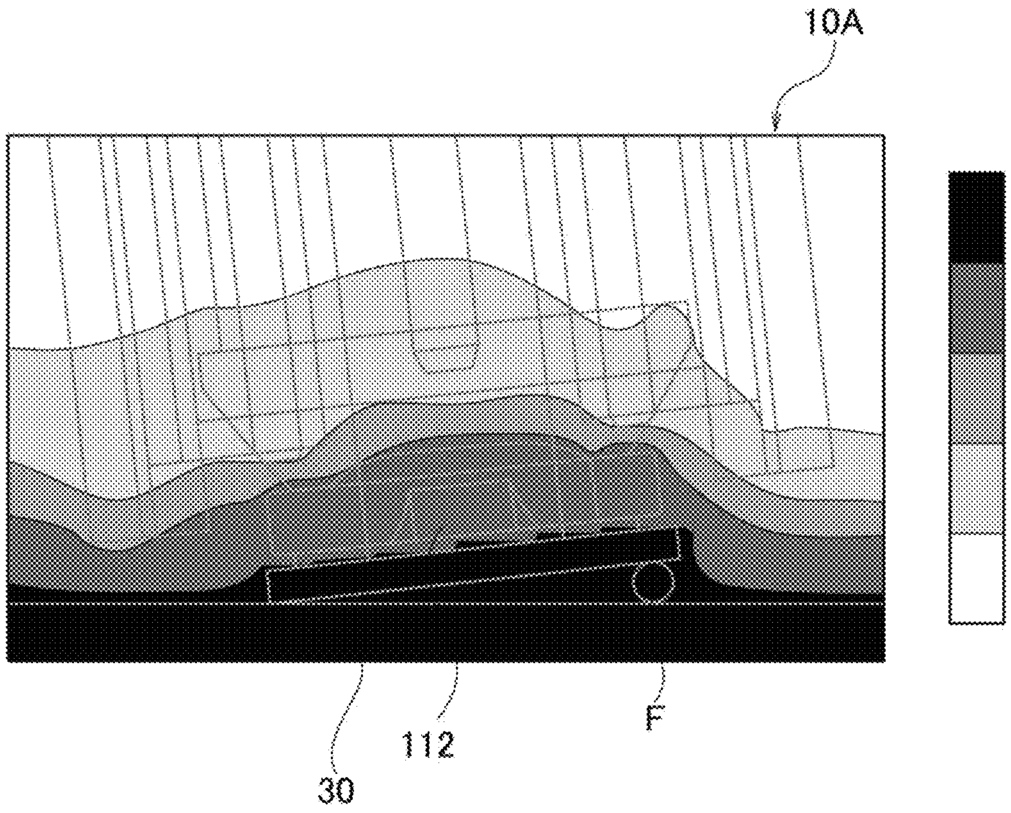
FIG. 19 is a diagram schematically showing a temperature distribution in a state in which a relatively large foreign material is present between the temperature sensor according to the comparative example and the part to be measured.

Further, FIGS. 18 and 19 show measurement results of the temperature distribution in the periphery of the single battery 30 when the single battery 30 is used while a foreign material F is interposed between the temperature sensor 10A according to the comparative example and the single battery (part to be measured) 30. At this point, the temperature sensor 10A according to the comparative example is placed on the upper surface of the single battery 30 in an oblique state. In FIG. 18, the size (diameter) of the foreign material F is 0.33 mm, and in FIG. 19, the size is 0.5 mm.

In a state shown in FIG. 18, a temperature measurement error of a temperature detected by the sensor chip (sensor part) 112 of the temperature sensor 10A is 1.87° C., while in a state shown in FIG. 19, a temperature measurement error is 2.17° C.

Therefore, it can be seen that a temperature measurement error of a temperature detected by the sensor chip (sensor part) 112 of the temperature sensor 10A increases as the size of the foreign material F interposed between the temperature sensor 10A and the single battery (part to be measured) 30 increases. In the states shown in FIGS. 16 and 17, it can be considered that a foreign material of which a size is 0 (0.0 mm) is interposed.

In this way, as the size of the foreign material F increases, a thickness of an air layer formed between the temperature sensor 10A and the single battery (part to be measured) 30 increases. Therefore, an influence of heat dissipation from the air layer generated due to the interposition of the foreign material F is considered to be one of factors that increases the temperature measurement error.

Although not shown in the drawings, when a foreign material of which a size is 0.33 mm is interposed between the temperature sensor 10 and the single battery (part to be measured) 30, a temperature measurement error of a temperature detected by the sensor chip (sensor part) 112 of the temperature sensor 10 is 1.13° C. Further, when a foreign material of which a size is 0.5 mm is interposed between the temperature sensor 10 and the single battery (part to be measured) 30, a temperature measurement error of a temperature detected by the sensor chip (sensor part) 112 of the temperature sensor 10 is 1.47° C.

In this way, a temperature measurement error of a temperature detected by the sensor chip (sensor part) 112 of the temperature sensor 10 also increases as the size of the foreign material F interposed between the temperature sensor 10 and the single battery (part to be measured) 30 increases. However, when the foreign material F of the same size is interposed, a temperature measurement error of the temperature sensor 10 with the peripheral wall 122 is smaller than that of the temperature sensor 10A without the peripheral wall 122. This is considered to be influenced by the fact that when the sensor chip (sensor part) 112 has the peripheral wall 122, heat is collected in a V-shape relative to the sensor chip, while when the sensor chip does not have the peripheral wall 122, since the sensor chip only has the bottom wall, heat collection properties deteriorate.

In addition, from the above results, it is considered that even if a foreign material larger than 0.5 mm is interposed, when the foreign material F of the same size is interposed, a temperature measurement error of the temperature sensor 10 with the peripheral wall 122 is smaller than that of the temperature sensor 10A without the peripheral wall 122.

Therefore, it is considered that even if the temperature sensor is placed on the single battery (part to be measured) 30 while the foreign material F is interposed therebetween, a temperature measurement error of the temperature sensor 10 with the peripheral wall 122 is smaller than that of the temperature sensor 10A without the peripheral wall 122.

Second Embodiment

Figure 20:
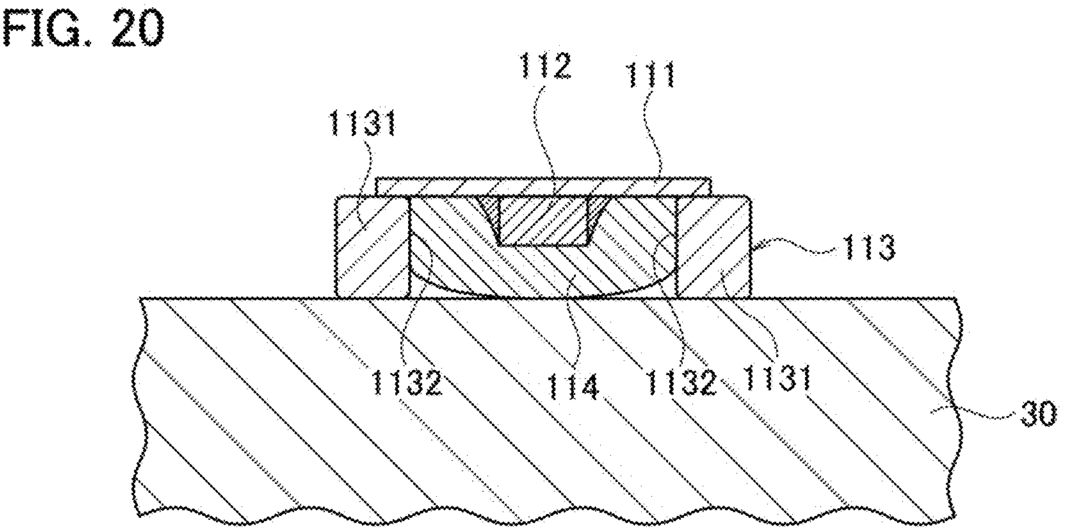
FIG. 20 is a diagram showing a state in which a temperature sensor module according to a second embodiment is attached to a part to be measured, and is a cross sectional view showing a state in which the temperature sensor module and the part to be measured are viewed from the front.

Next, an attaching structure 1 of the temperature sensor 10 according to a second embodiment will be described with reference to FIG. 20.

The attaching structure 1 of the temperature sensor 10 according to the present embodiment has basically the same configuration as the attaching structure 1 of the temperature sensor 10 of the first embodiment. That is, the attaching structure 1 of the temperature sensor 10 according to the present embodiment is formed by the holding member 20 holding the temperature sensor 10 while upward movement of the temperature sensor 10 in an up and down direction is regulated.

In the present embodiment, the frame-shaped member 113, which is arranged to surround the whole circumference of sides of the sensor part 112, functions as a heat collecting part. Specifically, the temperature sensor module 110 in the first embodiment is formed, and the temperature sensor module 110 is brought into direct contact with the single battery 30. In this way, the frame-shaped member 113 functions as a heat collecting part, and heat can be transferred to the sensor part 112 from multiple directions via a space surrounded by the peripheral wall 1131.

At this point, the single battery 30 is brought into contact with a surface (upper surface 11311) of the heat collecting part 113 on a side opposite to a side attached to the electric wire 111. Therefore, in the temperature sensor module 110 in the present embodiment, the resin cover part 114 is prevented from projecting upward from the upper surface 11311.

Even with this kind of configuration, the same action and effect as in the temperature sensor 10 in the first embodiment can be achieved.

Figure 21:
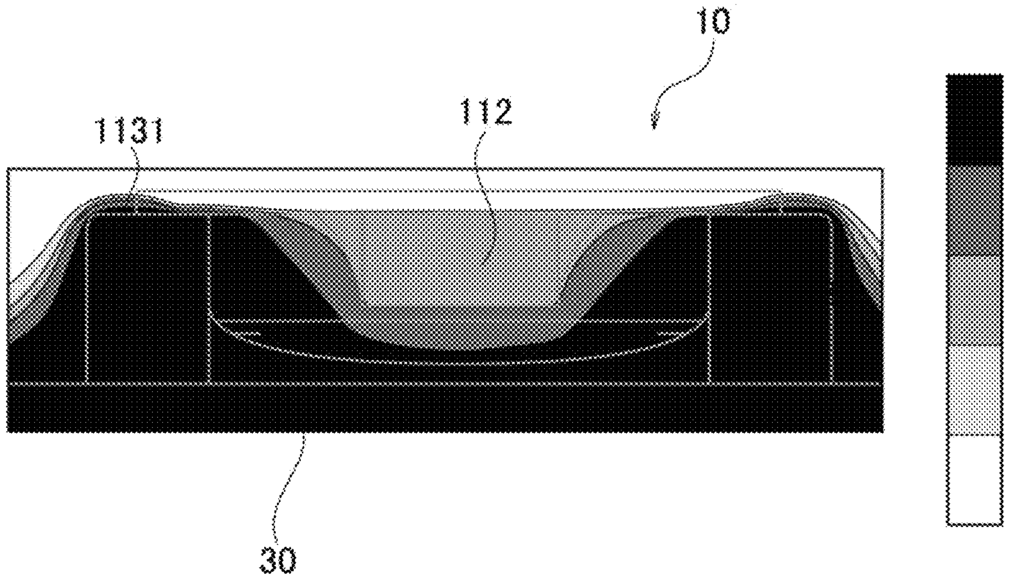
FIG. 21 is a diagram schematically showing a temperature distribution in a state in which a temperature sensor according to the second embodiment is placed horizontally on the part to be measured.

FIG. 21 shows a measurement result of the temperature distribution in the periphery of the single battery 30 when the single battery 30 is used while an upper surface of the single battery 30 is in surface contact with the bottom surface 1211 of the bottom wall 121 of the case 120 of the temperature sensor 10 according to the present embodiment. At this point, the temperature sensor 10 according to the present embodiment is placed horizontally on the upper surface of the single battery 30. FIG. 21 shows a diagram in which the temperature distribution in the periphery of the single battery 30 is divided into five regions, and a region with a darker color is a higher temperature region than a region with a lighter color.

In the measurement result shown in FIG. 21, a temperature measurement error of a temperature detected by the sensor chip (sensor part) 112 of the temperature sensor 10 according to the present embodiment is 0.814° C. The temperature measurement error is a value smaller than 1.03° C. which is a temperature measurement error of a temperature detected by the sensor chip (sensor part) 112 of the temperature sensor 10A.

From the above, it can be seen that a temperature detected by the sensor chip (sensor part) 112 of the temperature sensor 10 according to the present embodiment is closer to a temperature of the single battery (part to be measured) 30 than a temperature detected by the sensor chip (sensor part) 112 of the temperature sensor 10A.

Figure 22:
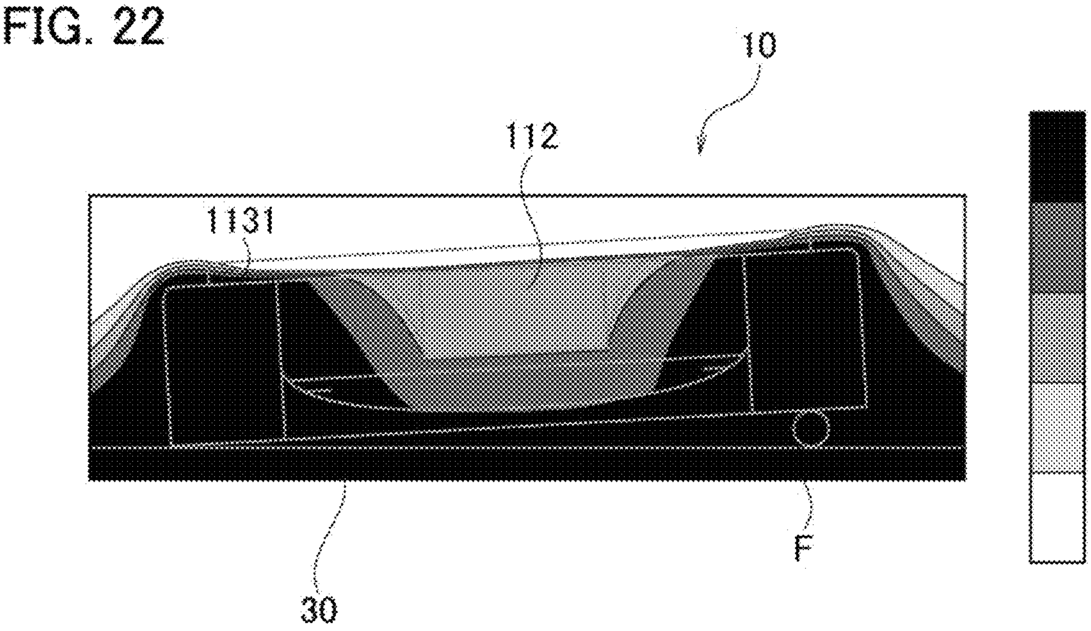
FIG. 22 is a diagram schematically showing a temperature distribution in a state in which a relatively small foreign material is present between the temperature sensor according to the second embodiment and the part to be measured.
Figure 23:
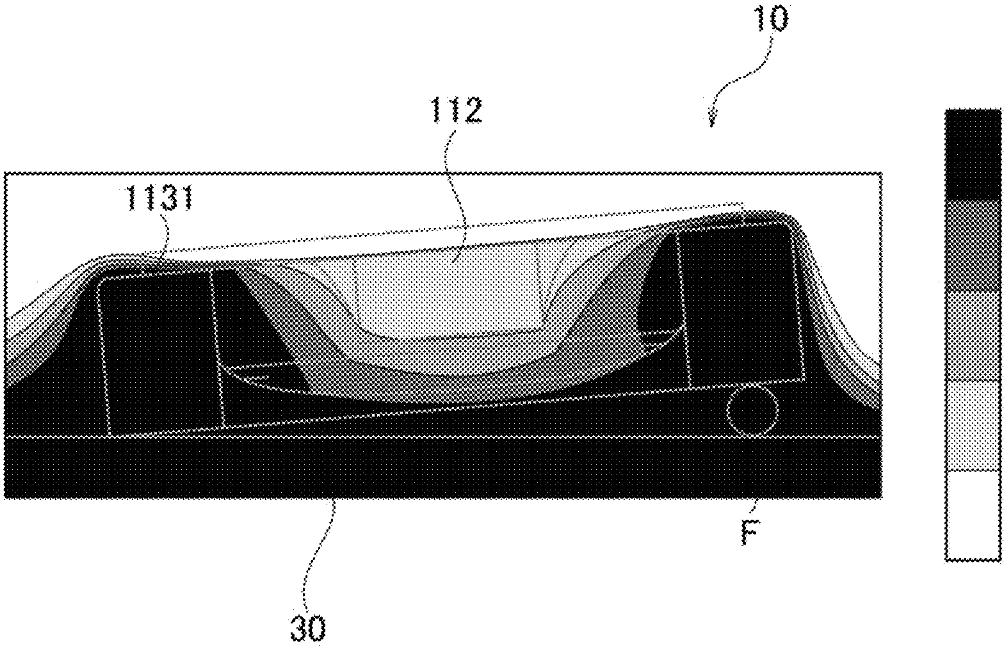
FIG. 23 is a diagram schematically showing a temperature distribution in a state in which a relatively large foreign material is present between the temperature sensor according to the second embodiment and the part to be measured.

Similarly, FIGS. 22 and 23 show measurement results of the temperature distribution in the periphery of the single battery 30 when the single battery 30 is used while a foreign material F is interposed between the temperature sensor 10 according to the present embodiment and the single battery (part to be measured) 30. At this point, the temperature sensor 10 according to the present embodiment is placed on an upper surface of the single battery 30 in an oblique state. In FIG. 22, the size (diameter) of the foreign material F is 0.33 mm, and in FIG. 23, the size is 0.5 mm.

In a state shown in FIG. 22, a temperature measurement error of a temperature detected by the sensor chip (sensor part) 112 of the temperature sensor 10 is 0.923° C., while in a state shown in FIG. 23, a temperature measurement error is 1.118° C.

From the above, it can be seen that a temperature measurement error of a temperature detected by the sensor chip (sensor part) 112 of the temperature sensor 10 increases as the size of the foreign material F interposed between the temperature sensor 10 and the single battery (part to be measured) 30 increases.

However, when the foreign material F of the same size is interposed, a temperature measurement error of the temperature sensor 10 according to the present embodiment is smaller than that of the temperature sensor 10A according to the comparative example.

Further, from the above results, it is considered that even if a foreign material larger than 0.5 mm is interposed, when the foreign material F of the same size is interposed, a temperature measurement error of the temperature sensor 10 according to the present embodiment is smaller than that of the temperature sensor 10A according to the comparative example.

From the above, it is considered that even if the temperature sensor is placed on the single battery (part to be measured) 30 while the foreign material F is interposed therebetween, a temperature measurement error of the temperature sensor 10 according to the present embodiment is smaller than that of the temperature sensor 10A according to the comparative example.

In this way, a temperature measurement error of the temperature sensor 10 according to the present embodiment is larger than a temperature measurement error of the temperature sensor 10 with the peripheral wall 122, but is smaller than a temperature measurement error of the temperature sensor 10A according to the comparative example.

In addition, with the configuration in the present embodiment, it is not necessary to separately dispose a heat collecting part such as a case 120, and the number of parts can be reduced. Further, it is possible to reduce costs while reducing the size of the temperature sensor 10.

[Action/Effect]

In the following, characteristic configurations of the temperature sensor of each of the above embodiments and effects obtained by the temperature sensors will be described.

The temperature sensor 10 in each of the above embodiments has the sensor part 112 which is attached to the flexible thin sheet-shaped electric wire 111, and which detects a temperature of the part 30 to be measured. Further, the temperature sensor 10 has the heat collecting parts 113 and 120 which are formed of members with high thermal conductivity, which contact the part 30 to be measured, and which can transfer heat generated by the part 30 to be measured to the sensor part 112. Still further, the heat collecting parts 113 and 120 have the peripheral walls 1131 and 122 arranged to surround at least a part of the sides of the sensor part 112.

In this way, heat generated by the part 30 to be measured is transferred to the heat collecting parts 113 and 120, and the heat transferred to the heat collecting parts 113 and 120 is transferred to the sensor part 112 from the peripheral walls 1131 and 122 arranged to surround at least a part of the sides of the sensor part 112. That is, the heat can be transferred to the sensor part 112 from multiple directions via a space surrounded by the peripheral walls 1131 and 122. Therefore, the heat generated by the part to be measured 30 can be transferred to the sensor part 112 more efficiently.

In this way, the temperature sensor 10 in each of the above embodiments can more efficiently transfer the heat generated by the part to be measured 30 to the sensor part 112.

Further, if it is possible to more efficiently transfer the heat generated by the part to be measured 30 to the sensor part 112, it is possible to enhance a temperature measurement performance of the part to be measured 30 and reduce a temperature measurement error of the part to be measured 30.

As a result, the heat generated by the part to be measured 30 can be more efficiently transferred to the sensor part 112, even if the contact between the temperature sensor 10 and the part to be measured 30 becomes a line contact or a point contact due to the inclination of the part to be measured 30 being mounted on the foreign material or being oscillated. That is, even if the temperature sensor 10 is not configured to follow the inclination of the part to be measured 30, the heat generated by the part to be measured 30 can be more efficiently transferred to the sensor part 112. In this way, if the temperature sensor 10 in each of the above embodiments is adopted, the configurations of the temperature sensor 10 and the holding member 20 can be simplified, and the size of the temperature sensor 10 and the holding member 20 can be reduced. As a result, the number of parts can be reduced, assembly processing costs can be reduced, and accordingly total costs can be reduced.

Further, the temperature sensor 10 in each of the above embodiments is formed using the flexible thin sheet-shaped electric wire 111. In this way, if the flexible thin sheet-shaped electric wire 111 is used, it is possible to solve following problems that arise when an ordinary electric wire is used.

First, if an ordinary electric wire is used, it is necessary to arrange an electric wire so as to crawl along an electric wire path. At this point, it is necessary to provide a bending R to prevent disconnection of the electric wire and extend the electric wire. Therefore, it is necessary to enlarge a space for the electric wire path.

Further, since there is a concern of disconnection of the electric wire due to strong interference with other components, an extra length of the electric wire is required, and there is a risk that the temperature sensor may increase more in size.

Further, if the temperature sensor uses the electric wire, it is necessary to pass the electric wire through the space for the electric wire path after the modularized temperature sensor is assembled to a holding member, and an assembly work takes time.

Meanwhile, since a thickness of the flexible thin sheet-shaped electric wire 111 is about ⅕ of an ordinary electric wire diameter, if the flexible thin sheet-shaped electric wire 111 is used, the space for the electric wire path can be made smaller, and the temperature sensor can be reduced in size. Therefore, when a temperature of a single battery mounted in a vehicle is measured using the temperature sensor 10 shown in each of the above embodiments, vehicle occupant comfort can be enhanced, for example.

Further, if the flexible thin sheet-shaped electric wire 111 is used, since a thickness is smaller than that of a hard substrate, a thermal resistance is reduced and a temperature measurement error of the part 30 to be measured can be reduced. As a result, a temperature measurement performance of the part 30 to be measured can be further enhanced. If a temperature of a single battery mounted in a vehicle is measured using the temperature sensor 10 in each of the above embodiments, the performance of the single battery can be enhanced, and fuel consumption can be further reduced, for example.

Further, the heat collecting part 120 may have the bottom wall 121 which is connected consecutively to the peripheral wall 122, and disposed between the electric wire 111 and the part 30 to be measured. Further, the frame-shaped member 113, which is arranged to surround the whole circumference of sides of the sensor part 112, may be attached to the electric wire 111. Still further, the resin cover part 114 covering the sensor part 112 may be formed between the frame-shaped member 113 and the sensor part 112. The frame-shaped member 113 may be fitted into the peripheral wall 122.

In this way, heat generated by the part to be measured 30 can be transferred to the sensor part 112 not only from the peripheral wall 122 but also from the bottom wall 121. As a result, the heat generated by the part to be measured 30 can be transferred to the sensor part 112 from more directions, and can be transferred to the sensor part 112 more efficiently.

Further, if the frame-shaped member 113 is fitted into the peripheral wall 122, positioning of the sensor part 112 can be performed more easily, and it is possible to suppress the sensor part 112 from being displaced by reaction force or the like generated in the flexible thin sheet-shaped electric wire 111, for example. As a result, the sensor part 112 can be placed on the part to be measured 30 more reliably, and it is possible to suppress deterioration in temperature measurement performance of the part to be measured 30 due to displacement of the sensor part 112 more reliably.

Further, if the sensor part 112 is covered by the resin cover part 114, it is possible to suppress the exposure of the sensor part 112 to the outside, and it is possible to suppress a short circuit caused by water being applied to the sensor part 112, for example.

In addition, since the resin cover part 114 is formed between the sensor part 112 and the frame-shaped member 113, which is arranged to surround the whole circumference of sides of the sensor part 112, it is possible to suppress an applied potting material from flowing out, and the sensor part 112 can be covered more reliably.

At this time, if a thermal conductivity of the frame-shaped member 113 and a thermal conductivity of the resin cover part 114 are higher than that of air, a heat transfer efficiency to the sensor part 112 increases, and a temperature measurement error of the part 30 to be measured can be reduced.

In addition, the heat collecting part 113 may be arranged to surround the whole circumference of sides of the sensor part 112. Still further, the resin cover part 114 covering the sensor part 112 may be formed between the heat collecting part 113 and the sensor part 112. The part 30 to be measured may be in contact with the surface 11311 of the heat collecting part 113 on a side opposite to a side attached to the electric wire 111.

This eliminates the necessity to separately dispose a heat collecting part such as a metallic case, and the number of parts can be reduced. It is also possible to reduce costs while reducing the size of the temperature sensor 10.

[Others]

Although the present embodiment has been described above, the present embodiment is not limited to the above description, and various modifications can be made within the scope of the gist of the present embodiment.

It is possible to use a temperature sensor having an appropriate combination of the configurations in each of the above embodiments, for example.

In addition, although the approximately rectangular parallelepiped sensor chip 112 has been exemplified in each of the above embodiments, a shape of the sensor chip 112 is not limited thereto, and may be various shapes such as an approximately cylindrical shape.

In addition, although the case 120 having an approximately rectangular parallelepiped box shape has been exemplified in each of the above embodiments, a shape of the case 120 is not limited thereto, and may be various shapes such as an approximately cylindrical box shape.

In addition, although the frame-shaped member 113 having an approximately rectangular contour shape has been exemplified in each of the above embodiments, a contour shape of the frame-shaped member 113 is not limited thereto, and may be various shapes such as an approximately circular contour shape.

Further, a heat collecting part formed by using a metal material has been exemplified in each of the above embodiments, but a heat collecting part can be formed of a resin with high thermal conductivity.

Further, it is possible to arrange a heat insulating member at an outer periphery of the heat collecting part such that the heat is transferred to the sensor part 112 more reliably.

In addition, specifications (shape, size, layout, and the like) of the sensor part, the heat collecting part, and other details can be appropriately changed.

The entire contents of Japanese patent application No. 2022-030677 (filed on Mar. 1, 2022) are herein invoked.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

10 Temperature sensor
111 Flexible thin sheet-shaped electric wire
112 Sensor chip (sensor part)
113 Frame-shaped member (heat collecting part)
1131 Peripheral wall
11311 Upper surface (surface on a side opposite to a side attached to an electric wire)
114 Resin cover part
120 Case (heat collecting part)
121 Bottom wall
122 Peripheral wall
30 Single battery (part to be measured)

The invention claimed is:

1. A temperature sensor comprising:

a sensor part that is attached to a flexible thin sheet-shaped electric wire and detects a temperature of a part to be measured; and a heat collecting part that is formed of a member with high thermal conductivity, that contacts the part to be measured, and that can transfer heat generated by the part to be measured to the sensor part, wherein the heat collecting part includes a peripheral wall arranged to surround at least a part of sides of the sensor part.

2. The temperature sensor according to claim 1, wherein the heat collecting part further includes a bottom wall that is connected consecutively to the peripheral wall and is disposed between the electric wire and the part to be measured, a frame-shaped member arranged to surround a whole circumference of the sides of the sensor part is attached to the electric wire, a resin cover part covering the sensor part is formed between the frame-shaped member and the sensor part, and the frame-shaped member is fitted into the peripheral wall.

3. The temperature sensor according to claim 1, wherein the heat collecting part is arranged to surround a whole circumference of the sides of the sensor part, a resin cover part covering the sensor part is formed between the heat collecting part and the sensor part, and a surface of the heat collecting part on a side opposite to a side attached to the electric wire is in contact with the part to be measured.

* * * * *